(12) United States Patent
Kropf et al.

(10) Patent No.: US 7,080,670 B1
(45) Date of Patent: Jul. 25, 2006

(54) METHOD AND DEVICE FOR FILLING A DRINKS CONTAINER WITH A DRINK PRODUCED FROM AN INITIAL LIQUID, AND CORRESPONDING DRINK CONTAINER

(75) Inventors: Rudolf Kropf, Hallabruch/Hufschlag (DE); Volker Markquardt, Bergen (DE)

(73) Assignee: Adelholzener Alpenquellen GmbH, Siegsdorf (DE)

( * ) Notice: Subject to any disclaimer, the term of this patent is extended or adjusted under 35 U.S.C. 154(b) by 0 days.

(21) Appl. No.: 10/532,652

(22) PCT Filed: Oct. 22, 2003

(86) PCT No.: PCT/EP03/11709

§ 371 (c)(1),
(2), (4) Date: Apr. 25, 2005

(87) PCT Pub. No.: WO2004/037706

PCT Pub. Date: May 6, 2004

(30) Foreign Application Priority Data

| Oct. 23, 2002 | (DE) | 102 49 399 |
| Oct. 23, 2002 | (DE) | 202 16 342 U |
| Sep. 18, 2003 | (DE) | 103 43 283 |

(51) Int. Cl.
*B65B 1/04* (2006.01)
(52) U.S. Cl. .............. 141/82; 141/2; 141/18; 141/9; 141/100
(58) Field of Classification Search .......... 141/2, 141/9, 18, 100, 82; 53/431, 432
See application file for complete search history.

(56) References Cited

U.S. PATENT DOCUMENTS 6,519,919 B1 * 2/2003 Takenouchi et al. .......... 53/431
6,889,725 B1 * 5/2005 Schultz et al. ................ 141/70

FOREIGN PATENT DOCUMENTS

| AT | 408 406 B | 11/2001 |
| DE | 198 25 559 C2 | 4/2001 |
| DE | 201 01 692 U | 7/2001 |
| EP | 0 421 597 A | 4/1991 |
| EP | 1 034 703 A | 9/2000 |
| JP | 58101667 A | 6/1983 |
| JP | 04234967 A | 8/1992 |

* cited by examiner

*Primary Examiner*—Steven O. Douglas
(74) *Attorney, Agent, or Firm*—Rothwell, Figg, Ernst & Manbeck, P.C.

(57) ABSTRACT

According to the inventive method, the filling of a drinks container (10) with a drink (15) produced from an initial liquid (24) and containing a gas dissolved therein is carried out in an inventive device (20) comprising a filling device (50) which fills the drink container (10) with the drink (15) in such a way that a pre-determined residual gas volume (14) remains above the drink (15) in the drinks container (10). The inventive device also comprises a closing device (74) which closes the drinks container (10). According to the invention, a liquid oxygen supply device (64), which is directly arranged upstream of the closing device (74) in the transport direction of the drinks container (10), introduces a pre-determined amount of liquid oxygen into the drinks container (10). The inventive drinks container can hold even high concentration of gas, especially oxygen, dissolved in the drink at least until the best before date.

26 Claims, 3 Drawing Sheets

METHOD AND DEVICE FOR FILLING A DRINKS CONTAINER WITH A DRINK PRODUCED FROM AN INITIAL LIQUID, AND CORRESPONDING DRINK CONTAINER

CROSS REFERENCE TO RELATED APPLICATION

This application is a 35 USC § 371 National Phase Entry Application from PCT/EP2003/011709, filed Oct. 22, 2003, and designating the United States.

The invention relates to a method for filling a drinks container with a drink which is produced from an initial liquid and has a gas dissolved therein, comprising the steps of filling the drinks container with the drink in such a manner that a pre-determined residual gas volume remains above the drink in the drinks container, and closing a container opening of the drinks container.

A method of this type is disclosed, for example, by DE-U-201 01 692. This describes a method in which a drinks bottle is filled with pressurized-oxygen-enriched water. As is generally customary here, in this method also, the drinks container is not filled completely up to the upper edge of its opening, but a residual gas volume remains between the liquid surface of the drink in the filled drinks container and the edge of the opening of the drinks container. In the case of oxygen-enriched drinks, this is associated with the disadvantage that a portion of the oxygen dissolved in the drink, owing to the differing oxygen partial pressures in the drink on the one hand and the residual gas volume on the other, is released and as a result the oxygen content in the drink decreases. Therefore, to achieve a defined oxygen content in the drink, customarily a correspondingly larger amount of oxygen must be dissolved in the drink in order by this means to compensate for losses into the residual gas volume. It must be noted here that the amount of oxygen dissolved in the drink when the minimum shelf life date expires must correspond at least to the amount of dissolved oxygen declared on the label of the drinks container. The abovementioned undesired release of the oxygen is particularly disadvantageous in the case of the plastic bottles which are prized by consumers, since in these a greater residual gas volume is present, compared with glass bottles.

In the prior art, in addition, methods are known for filling a drinks container with a drink, in which the residual gas volume is pressurized by feeding a predetermined amount of liquid nitrogen. For this, reference may be made, for example, to EP-B-0 481 019 and EP-B-0 854 089. Liquid nitrogen is fed into the residual gas volume in particular in the packaging of beers or fruit juices. The feed of the liquid nitrogen serves to displace the oxygen present in the residual gas volume from the container before the container is closed or sealed. The presence of oxygen in the residual volume is undesirable, since the drink and, in particular, the constituents making up its flavor, are oxidation-sensitive. Furthermore, the oxygen promotes the growth of microorganisms which can lead, for example in the case of alcoholic drinks, to esterification of the drink.

DE-C-34 19 855 further discloses in this context a device for the delivery of an uninterrupted jet of a cryogenic liquid, in particular liquid nitrogen.

In contrast, it is an object of the present invention to specify a device of the type mentioned at the outset in which the undesirable release of the gas dissolved in the drink, in particular oxygen, is at least significantly reduced, if not completely prevented.

This object is achieved according to the invention by a method of the type mentioned at the outset in which a predetermined amount of liquid oxygen is introduced into the drinks container and the drinks container is closed directly after introduction of the liquid oxygen.

After the predetermined amount of liquid oxygen is fed into the drinks container, the liquid oxygen begins to vaporize. The resultant gaseous oxygen displaces the gas present in the residual gas volume and thus produces in the residual gas volume an atmosphere ideally consisting essentially completely of oxygen gas. After the container opening is sealed or closed, the further vaporization of the liquid oxygen leads to a pressure rise in the residual gas volume and thus in the entire drinks container. In this manner, in the residual gas volume an oxygen partial pressure prevails which is so high that unwanted release of the oxygen dissolved in the drink is at least impeded, if not even completely prevented.

Depending on the volume of the drinks container, the predetermined amount of liquid oxygen can be at least about 0.1 ml, preferably between about 0.1 ml and about 3.0 ml, more preferably between about 0.1 ml and about 1.5 ml, still more preferably between about 0.1 ml and about 1.0 ml. In this context, reference may be made to the fact that 1 kg of liquid oxygen is equivalent to a volume of 0.867 l of liquid oxygen or, after vaporization, a volume of 0.747 m$^3$ of gaseous oxygen. Whereas conventionally filled PET bottles having an oxygen-containing drink have, after closing, a pressure of about 2.5 bar to 3.0 bar, the inventively filled drinks container has a pressure of up to 7.0 bar on introduction of the above specified amount of liquid oxygen, as is described in more detail below. Thus drinks containers filled by the inventive method have a considerably higher internal pressure than conventional drinks containers and the content of gas dissolved in the drink, in particular oxygen, is also considerably higher in the drinks containers filled by the inventive method than in drinks containers filled by conventional methods, and this at the same concentration of gas, in particular oxygen, originally dissolved in the drink, that is to say at the time point of the drinks container being filled with the drink.

The inventively achieved advantages are independent of bottle volume, bottle shape, closure type and desired oxygen content in the drink. That is to say the inventive advantages may be achieved not only with glass bottles, but also with plastic bottles, and here not only with monolayer plastic bottles, but also with multilayer plastic bottles, and also with metal bottles with plastic closures or metal closures, in the case of closures with or without additional sealing layer and in the case of differing shapes of the bottle neck region receiving the residual gas volume.

The amount of liquid oxygen to be fed into the drinks container can be determined, for example, by appropriate choice of the opening time of a valve of constant passage cross section. Here, for example, in calibration experiments, if the amount of liquid oxygen flowing through the constant passage cross section of the valve per unit time has been determined, it then suffices to open the valve for a predetermined period of time to deliver the desired amount of liquid oxygen into the drinks container. The cycling of the metering valve, that is to say the opening and closing of the constant passage cross section can be performed, for example, as a function of the cycling of the filling device or as a function of the output signals of suitable sensors for determining the presence of a drinks container. The passage cross section of the valve can be chosen without problems in such a manner that the required amount of liquid oxygen can be introduced into the container in the time available which is predetermined by the rhythm of the filling device.

If the filling device predetermines a very fast operating rhythm, that is to say only little time is available for a feed of liquid oxygen, it can be advantageous, with respect to the switching times required for the opening and closing of the constant passage cross section of the valve to transfer from the cycled feed to a continuous feed of liquid oxygen. In this case, the amount of liquid oxygen introduced into the container can be determined by the amount of liquid oxygen delivered per unit of time by the metering valve and the residence time of the container opening in the region of the oxygen jet. It may be necessary here to match the constant passage cross section by suitable widening or constricting to the rhythm predetermined by the filling device.

In a development of the invention it is proposed that the oxygen is liquefied only shortly before being fed into the drinks container in a heat exchanger charged with gaseous oxygen and a cooling liquid, for example liquid nitrogen. This method variant has proved advantageous especially with respect to the operating hazards due to liquid oxygen, in particular the dangers of explosion and fire.

The inventive method can be used with advantage not only when the gas dissolved in the drink is oxygen, but also when a carbon dioxide-oxygen mixture is dissolved in the drink. The undesirable escape or release or outgassing of carbon dioxide represents a lesser problem in practice than outgassing of oxygen, since carbon dioxide in the drink is customarily present at considerably higher concentration.

For example, the carbon dioxide-oxygen mixture can be present at between about 200 mg/l and about 500 mg/l, preferably between about 200 mg/l and about 400 mg/l, of oxygen, and between about 1.0 g/l and about 4.0 g/l, preferably between about 1.0 g/l and about 2.0 g/l, more preferably between about 1.4 g/l and about 1.8 g/l, still more preferably between about 1.5 g/l and about 1.7 g/l, of carbon dioxide. With these figures, reference is made to the state of the drink immediately after filling of the drinks container and closure of the drinks container.

To be able to dissolve as much oxygen as possible in the drink or in the initial liquid for production of the drink, it has proved to be advantageous for the initial liquid to have already been enriched with carbon dioxide before it is enriched with oxygen. The initial liquid can be enriched with carbon dioxide without degassing it in advance.

However, it is likewise possible in principle to enrich the initial liquid with a premixed carbon dioxide-oxygen mixture. This carbon dioxide-oxygen mixture can comprise, for example, between about 2% by volume and about 50% by volume of oxygen and between about 98% by volume and about 50% by volume of carbon dioxide, preferably about 25% by volume of oxygen and about 75% by volume of carbon dioxide. These figures for the mixing ratio relate here to the regular operation of the enrichment device, that is to say its operation after closure of a running-in phase of the enrichment.

"Degassing" is customarily taken to mean the targeted expulsion of gas, in particular oxygen, which is already naturally dissolved in the initial liquid, for example spring water, in order to produce a defined ground state of the initial liquid. This degassing is necessary in the production of beer, fruit juices, lemonades and the like, in order to expel any oxygen fractions present in the initial liquid, since these, as already explained above, can lead to oxidation of the constituents, in particular the flavor substances. In contrast thereto, "outgassing" is taken to mean an unintended, but tolerated escape or release of gas present in the initial liquid. For instance, in the case of the above-described separate enrichment of the initial liquid with carbon dioxide on the one hand, and oxygen on the other, during the enrichment with oxygen, escape or outgassing of carbon dioxide can occur. However, this can be tolerated, since carbon dioxide, as mentioned above, can be dissolved to a considerably greater extent in the initial liquid.

Furthermore, reference may be made to the fact that, in the context of enrichment of the initial liquid with a gas, for example carbon dioxide or oxygen or a carbon dioxide-oxygen mixture, "impregnation" of the initial liquid with the gas is also spoken of.

In order to be able to increase the absorption capacity of the initial liquid for gas to be dissolved therein, in a development of the invention it is proposed that the initial liquid is cooled to a temperature of between about 3° C. and about 9° C., preferably about 6° C., before it is enriched with gas. In the production and charging of enriched water, this temperature is essentially maintained up to filling of the drinks container. In the production of drinks with admixed constituents, for example sweet drinks, the admixture of the constituents can lead to a slight warming of the initial liquid. However, this customarily does not exceed a value of about 2° C.

In order to be able to create a defined atmosphere in the drinks container before it is filled with the drink, it is further proposed that the drinks container is prepressurized with an inert gas, for example carbon dioxide gas, before it is filled with the drink. The prepressurizing pressure of the inert gas can be here between about 5.0 bar and about 8.0 bar, preferably between about 6.5 bar and about 7.0 bar.

Prepressurizing the drinks container with an inert gas has quite a few operating advantages compared with prepressurizing with pure oxygen gas or sterile air. For instance, in the case of prepressurizing with pure oxygen gas, particular fire precaution measures must be taken, whereas in the case of prepressurizing with sterile air, owing to the use of compressors and sterile filters required for this, there is the risk of a flavor impairment of the drink in the event of a defect of the compressors or a contamination of the sterile filters, for example with microorganisms. Therefore independent protection is the concept of prepressurizing the drinks container with an inert gas, in particular carbon dioxide gas.

As already mentioned above, the initial liquid can essentially comprise water. All waters mentioned in the German regulation on mineral and table water (MTVO) come into consideration here, in particular drinking water, spring water, table water, natural mineral water and therapeutic water.

In addition, at least one constituent can be added to the initial liquid. As constituent which comes into consideration is at least one substance from the group comprising the following substances: sugar, sugar replacers, sweeteners, flavorings, quinine, caffeine, taurine or like substances formed from amino acids, nutrients, colorants, plant and herb extracts, milk and whey products, alcohol, fatty acids, substances from fruit and/or vegetables and/or cereals, organic and inorganic acids, thickeners, emulsifiers.

Advantageously, at least one oxygen-resistant constituent is used here. The addition of the at least one constituent can be performed, for example, between the enrichment of the initial liquid with carbon dioxide and the enrichment with oxygen.

According to a further aspect, the present invention relates to a device for filling a drinks container with a drink which is produced from an initial liquid and has gas dissolved therein, in particular for carrying out the inventive method, comprising a filling device which fills the drinks container with the drink in such a manner that a predetermined residual gas volume remains in the drinks container above the drink, and a closing device which closes the drinks container and further comprising a liquid oxygen feed device which is disposed immediately upstream of the closing device in the transport direction of the drinks containers, which liquid oxygen feed device introduces a predetermined amount of liquid oxygen into the drinks container. This filling device also achieves the object specified above.

With respect to the development possibilities specified in the dependent claims for this filling device and the advantages achievable by these development possibilities, reference may be made to the discussion hereinbefore of the inventive method. In particular, a filling device operating by the isobarometric filling principle can be used.

According to a further aspect, the present invention further relates to a drinks container having a drink comprising dissolved gas absorbed therein, which drinks container has preferably been charged by the inventive method and in addition preferably using the inventive device and after it is filled with the drink and its container opening is closed, is put under pressure by vaporizing at least a portion of a predetermined amount of liquid oxygen introduced into it. This drinks container also achieves the object specified hereinbefore since it is able to hold even high concentrations of oxygen dissolved in the drink at least until the expiry of the minimum shelf life date.

Whereas conventionally filled PET bottles containing an oxygen-containing drink, after closure, have a pressure of about 2.5 bar to 3.0 bar, the pressure prevailing in the drinks container can have a value of between about 3.1 bar and about 7.0 bar, preferably of between about 3.1 bar and about 6.0 bar, more preferably of between about 3.5 bar and about 4.6 bar.

As already mentioned hereinbefore, the container wall can be fabricated from glass or plastic or metal, with, in the case of plastic containers, the container wall being able to have a single layer construction or a multilayer construction. Suitable metals are in particular tin plate or aluminum.

The multilayer structure of plastic containers can comprise here, for example a multiplicity of base plastic layers, for example PET layers, between which at least one barrier layer of a plastic is embedded which has a lower gas permeability than the base plastic, for example a nylon layer. In addition, or alternatively, however, it is also possible to provide the base plastic on the inside and/or outside of the drinks container with a suitable barrier coating, for example by vaporizing, spraying or like coating methods. Such barrier coatings can comprise, as constituent, for example silicon.

To be able to counteract further undesirable out-gassing, in particular of oxygen, it is proposed that between the container opening and a lid closing the container opening, a sealing element, preferably a sealing disk, is disposed.

The invention will be described in more detail hereinafter with reference to example embodiments based on the accompanying drawing. In the drawing.

Figure 1:
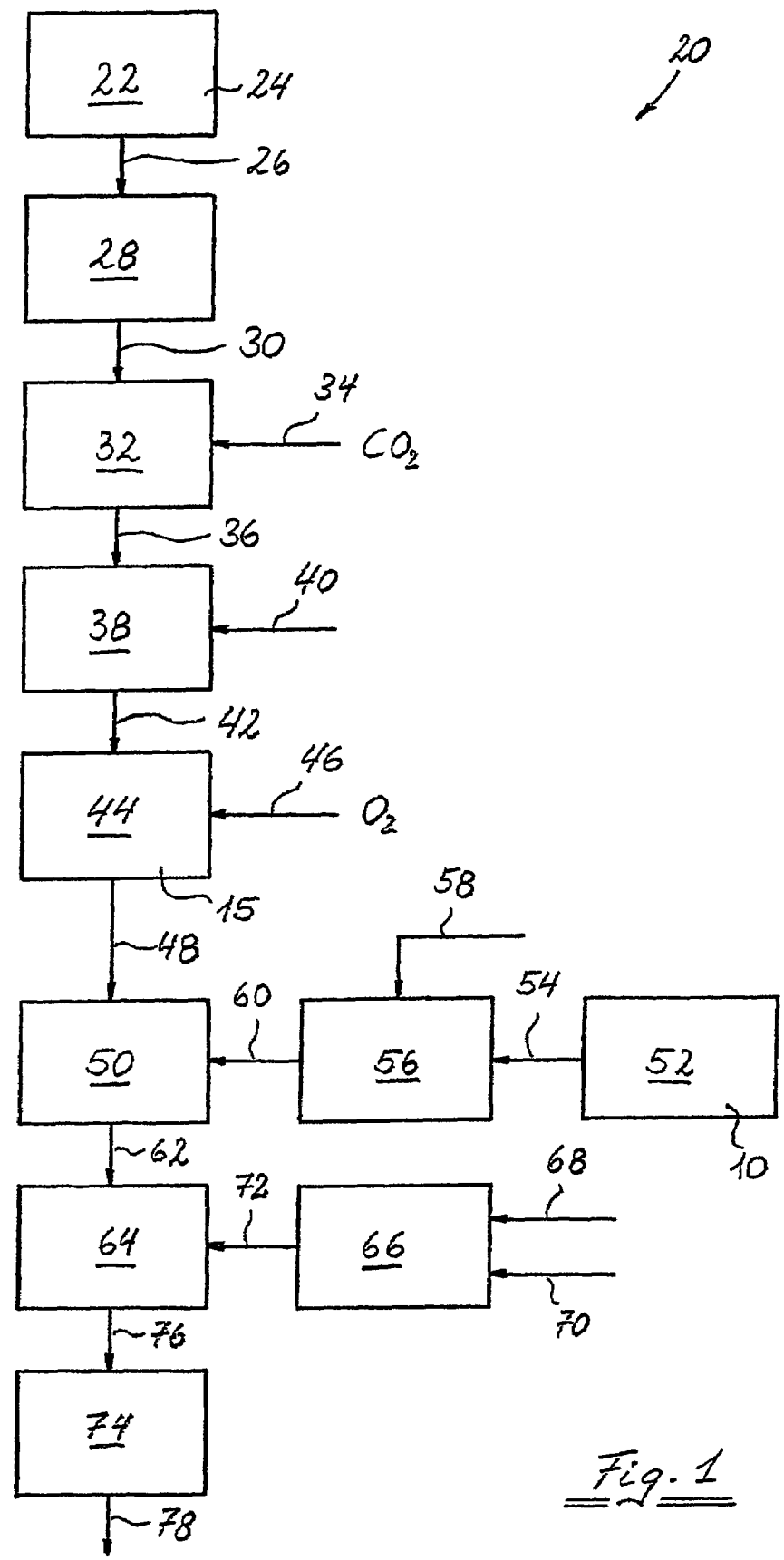
FIG. 1 shows a diagrammatic block diagram for explaining the inventive method and the structure and function of the inventive device according to a first embodiment variant.

In FIG. 1, a device according to the invention for producing and charging a drink having gas dissolved therein is indicated in general by 20.

Figure 3:
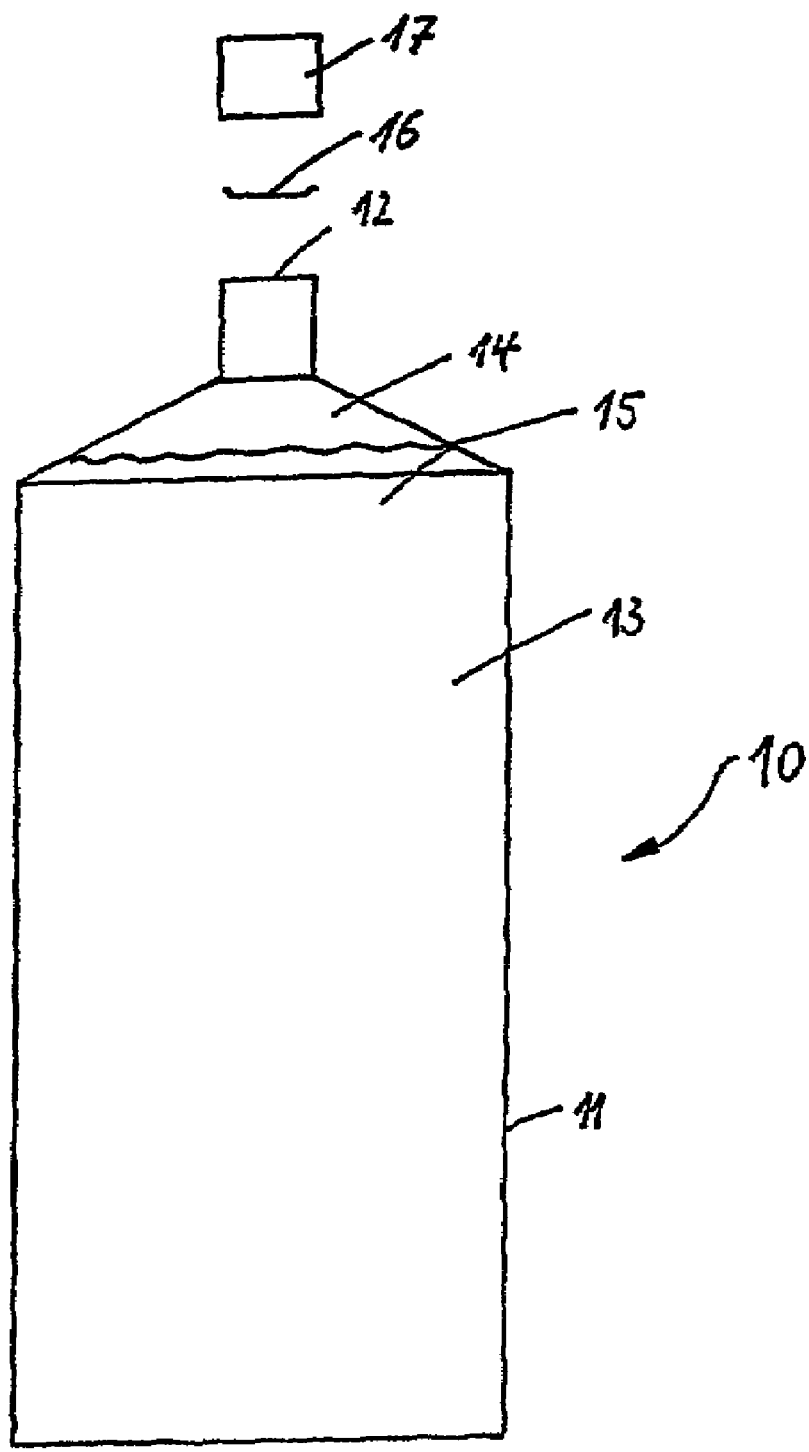
FIG. 3 shows a diagrammatic depiction of a drinks container filled by the inventive method.

In a liquid reservoir 22, an initial liquid 24, for example natural mineral water, is provided for preparing the drink 15 (see FIG. 3). Correspondingly, the liquid reservoir 22 can be formed by the source itself or an intermediate storage tank. Via a line 26, the initial liquid 24 is fed to a cooling device 28 in which the initial liquid 24 is cooled to a pre-determined temperature.

Via a further line 30, the initial liquid is then passed on to a carbon dioxide enrichment device 32 in which the initial liquid 24 is admixed or impregnated with carbon dioxide gas. The carbon dioxide gas is fed to the enrichment device 32 via a line 34.

It must be emphasized that the initial liquid 24 does not need to be degassed upstream of the carbon dioxide enrichment. Such a degassing conventionally has the purpose of expelling any oxygen naturally present in the initial liquid so that this cannot impair, in particular oxidize, the constituents, for example flavor substances, further added to the initial liquid later. Since in the present case the initial liquid is further enriched with oxygen, in any case, however, in a subsequent method step still to be described, the degassing can be omitted completely.

If desired, the carbon dioxide-enriched initial liquid 24 is passed via a line 36 into a mixer 38 in which the initial liquid 24 is mixed with constituents, for example syrup, aroma substances or flavor substances, magnesium carbonate or like substances from the group listed at the outset. These constituents are fed to the mixer 38 via lines collectively indicated by 40. Alternatively, the carbon dioxide-enriched initial liquid 24 can be fed, however, directly to a second enrichment device 44.

Via a line 42, the initial liquid which is enriched with carbon dioxide and, if desired, admixed with constituents, is then passed into a second enrichment device 44 in which it is enriched or impregnated with oxygen gas. The oxygen gas is fed to the enrichment device 44 via a line 46.

The thus completed drink 15 is then fed via a line 48 to a filling device 50 in which it is charged into the drinks container 10 (see FIG. 3), preferably by the isobarometric filling principle.

In order to be able to maintain in the drink 15 a concentration as high as possible of oxygen dissolved therein, it is important that the method step of oxygen enrichment is the last method step upstream of filling the drinks containers 10 with the drink 15 and that the oxygen enrichment proceeds independently of the method steps of the carbon dioxide enrichment and the admixture of constituents, that is to say in a separate method step.

Although it has been described hereinbefore as preferred to carry out the admixture of constituents downstream of the carbon dioxide enrichment, this can in principle also be carried out upstream of the carbon dioxide enrichment.

The cleaned drinks containers 10 are provided in a container store 52 and are transported from there via a transport section 54 to a prepressurizing apparatus 56. In the prepressurizing apparatus 56 the interior 13 (see FIG. 3) of the drinks containers 10 is flushed with inert gas, for example carbon dioxide gas, which is fed via a feed line 58 and is prepressurized to a predetermined pressure.

Via a further transport section 60, the drinks containers 10 which are thus prepared pass to the filling device 50 in which each of the drinks containers 10 is filled with a predetermined amount of the drink 15. In this process a residual gas volume 14 (see FIG. 3) in which carbon dioxide gas is situated remains in the drinks container 10 above the drink 15. This residual gas volume is also termed the headspace of the drinks container 10.

Via a further transport section 62, the filled drinks containers 10 pass to a station 64 in which a predetermined amount of liquid oxygen is passed into the drinks container 10. Directly after the introduction of the liquid oxygen, it begins to vaporize and displace the inert gas from the residual gas volume 14, so that an essentially pure oxygen atmosphere is formed in the residual gas volume 14.

The liquid oxygen can be produced, for example, in a liquefying device 66, for example a heat exchanger, to which is fed firstly gaseous oxygen via a feed line 68, and liquid nitrogen as coolant via a feed line 70. The oxygen liquefied in the heat exchanger 66 is passed on to the station 64 via a line 72.

Directly after the introduction of the liquid oxygen, in a closing device 74, the opening 12 of the drinks container 10 is closed by a lid 17 (see FIG. 3). Between the lid 17 and the container opening 12, in addition, a sealing disk 16 can be disposed which has the task of further improving the gastight seal of the drinks container 10. The transport section 76 between the station 64 and the closing device 74 is of a size such that in the closure of the container opening 12, not yet all of the liquid oxygen introduced into the drinks container 10 in the station 64 is vaporized. Preferably, the container opening 12 is closed at the latest about 1 second after the introduction of the liquid oxygen. Of course, between the filling and closing of the drinks container, a longer period of time can be allowed to pass, provided that just a sufficient amount of liquid oxygen is fed to the drinks container.

In this context, reference may be made to the fact that the oxygen gas which is formed by vaporization from the liquid oxygen even before closure of the drinks container 10 takes over important flushing functions. Firstly it displaces the inert gas residues still situated in the headspace 14 and ensures an essentially pure oxygen atmosphere in the headspace 14. Secondly, the oxygen gas leaving from the container opening 12, on approaching the lid 17, flushes its "pot-like" lid volume, so that no undesirable gas can be carried over into the headspace 14 by the lid 17. This is advantageous, in particular in the case of large-volume closures, for example reclosable drinks closures, which remain connected to the drinks container even in the open state, what are termed "sportscaps".

It must be noted, however, that when a sealing element 16 is used this flushing is obviously not possible or only possible to a slight extent. Owing to the presence of the sealing element 16, the flushing function, however, is also not required at all, since the sealing element 16 in any case prevents carry over of undesirable gases into the headspace 14.

After the closure of the drinks container 10, the residual liquid oxygen which is still vaporizing leads to an increase in the pressure in the drinks container 10. Since an essentially pure oxygen atmosphere is present in the residual gas volume 14 in this manner, in this residual gas volume 14 an oxygen partial pressure prevails which is high enough that the tendency of the oxygen dissolved in the drink 15 to outgas from the drink 15 is at least reduced compared with the prior art, if not completely excluded.

From the closure station 74, the drinks containers thus filled pass via a transport section 78 to a packaging station which is not shown in which they are packaged into drinks crates or the like.

The drinks containers 10 can have, for example, a container wall 11 fabricated, for example, from glass or plastic, preferably PET (see FIG. 3). In the case of plastic containers, the container wall 11 can in addition have either a monolayer structure or a multilayer structure.

Compared with the conventional production and packaging of oxygen- and, if desired, carbon-dioxide-enriched drinks, using the inventive method and the inventive device, an increase of the oxygen content in the finished filled and closed drinks containers by at least about 30% to 35% can be achieved.

Figure 2:
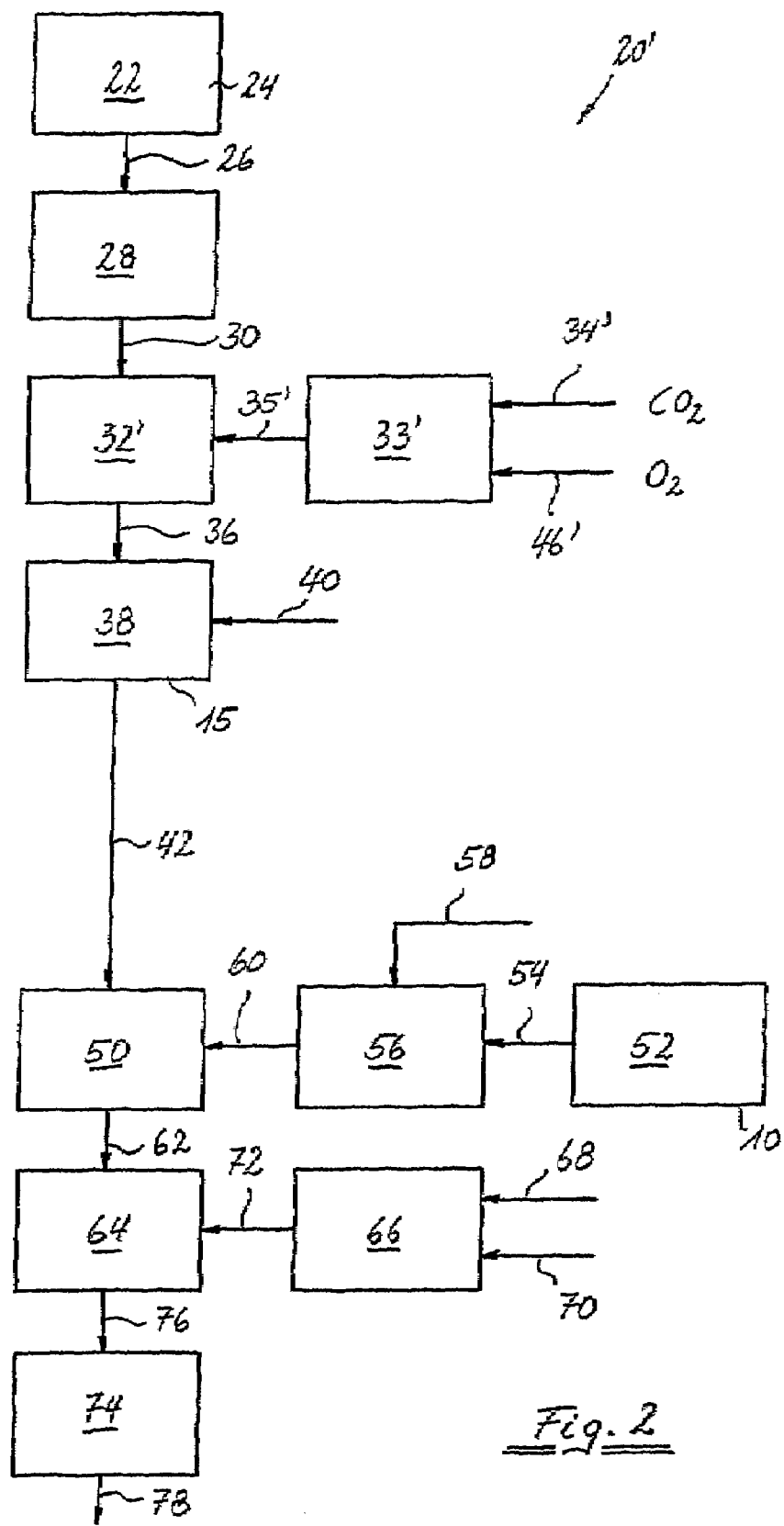
FIG. 2 shows a diagrammatic block diagram for explaining the inventive method and the structure and function of the inventive device according to a second embodiment variant.

FIG. 2 shows a further embodiment of an inventive device for producing and packaging a drink having gas dissolved therein. This corresponds essentially to the embodiment according to FIG. 1. Therefore, in FIG. 2 similar parts are given the same designations as in FIG. 1, while the designations relating to the modifications are given a dash. Furthermore, the embodiment according to FIG. 2 will also only be described hereinafter where it differs from the embodiment according to FIG. 1, to the description of which reference is hereby made explicitly.

The device 20' for the production and packaging of a drink 15 differs from the device 20 according to FIG. 1 only in that the initial liquid 24 is not enriched with carbon dioxide and oxygen in two separate steps or enrichment devices 32 and 44, but in a single enrichment device 32'. For this, carbon dioxide gas is fed to a mixer 33' via a first line 34' and oxygen gas is fed via a second line 46' to a mixer 33'. In the mixer 33' the two gases are mixed with one another in a predetermined ratio, for example about 25% by volume of oxygen gas to about 75% by volume of carbon dioxide gas. The ready mixed carbon dioxide-oxygen mixture is then fed via a line 35' to the enrichment device 32'.

The invention claimed is:

1. A method for filling a drinks container (10) with a drink (15) which is produced from an initial liquid (24) and has a gas dissolved therein comprising the steps of
    filling the drinks container (10) with the drink (15) in such a manner that a predetermined residual gas volume (14) remains above the drink (15) in the drinks container (10), and
    closing a container opening (12) of the drinks container (10),
characterized in that a predetermined amount of liquid oxygen is introduced into the drinks container (10) and the drinks container (10) is closed directly after introduction of the liquid oxygen, the oxygen only being liquefied in a heat exchanger (66) charged with gaseous oxygen and a cooling medium, for example liquid nitrogen, shortly before being fed into the drinks container (10).

2. The method as claimed in claim 1,
    characterized in that the predetermined amount of liquid oxygen is at least about 0.1 ml, preferably between about 0.1 ml and about 3.0 ml, more preferably between about 0.1 ml and about 1.5 ml, still more preferably between about 0.1 ml and about 1.0 ml.

3. The method as claimed in claim 1,
    characterized in that the amount of liquid oxygen to be fed into the drinks container (10) is determined by appropriate choice of the opening time of a valve of constant passage cross section.

4. The method as claimed in claim 1,
characterized in that the gas dissolved in the drink (15) comprises oxygen or a carbon dioxide-oxygen mixture.

5. The method as claimed in claim 4,
characterized in that the carbon dioxide-oxygen mixture comprises between about 200 mg/l and about 500 mg/l, preferably between about 200 mg/l and about 400 mg/l, of oxygen and between about 1.0 g/l and about 4.0 g/l, preferably between about 1.0 g/l and about 2.0 g/l, more preferably between about 1.4 g/l and about 1.8 g/l, still more preferably between about 1.5 g/l and about 1.7 g/l, of carbon dioxide.

6. The method as claimed in claim 1,
characterized in that the initial liquid (24) has already been enriched with carbon dioxide before it is enriched with oxygen.

7. The method as claimed in claim 6,
characterized in that the initial liquid (24) is enriched with carbon dioxide without degassing it in advance.

8. The method as claimed in claim 1,
characterized in that the initial liquid (24) is enriched with a carbon dioxide-oxygen mixture.

9. The method as claimed in claim 8, characterized in that the carbon dioxide-oxygen mixture comprises between about 2% by volume and about 50% by volume of oxygen and between about 98% by volume and about 50% by volume of carbon dioxide, preferably about 25% by volume of oxygen and about 75% by volume of carbon dioxide.

10. The method as claimed in claim 1,
characterized in that the initial liquid (24) is cooled to a temperature of between about 3° C. and about 9° C., preferably about 6° C., before it is enriched with gas.

11. The method as claimed in claim 1, characterized in that the drinks container (10) is prepressurized with an inert gas, for example carbon dioxide gas, before it is filled with the drink (15).

12. The method as claimed in claim 11, characterized in that the prepressurizing pressure of the inert gas is between about 5.0 bar and about 8.0 bar, preferably between about 6.5 bar and about 7.0 bar.

13. The method as claimed in claim 1, characterized in that the initial liquid (24) essentially comprises water.

14. The method as claimed in claim 1, characterized in that at least one constituent is added to the initial liquid (24).

15. The method as claimed in claim 6,
characterized in that the at least one constituent is added to the initial liquid (24) between the enrichment with carbon dioxide and the enrichment with oxygen.

16. A device (20) for filling a drinks container (10) with a drink (15) which is produced from an initial liquid (24) and has gas dissolved therein, in particular for carrying out the method as claimed in claim 1, comprising
a filling device (50) which fills the drinks container (10) with the drink (15) in such a manner that a predetermined residual gas volume (14) remains in the drinks container (10) above the drink (15), and
a closing device (74) which closes the drinks container (10),
characterized in that it additionally comprises a liquid oxygen feed device (64) which is disposed immediately upstream of the closing device (74) in the transport direction of the drinks containers (10) and which introduces a predetermined amount of liquid oxygen into the drinks container (10), the liquid oxygen feed device (64) comprising a heat exchanger (66) which is connected to a first feed line (68) for feeding gaseous oxygen and secondly to a second feed line (70) for feeding cooling medium, for example liquid nitrogen and the oxygen only being liquefied shortly before being fed into the drinks container.

17. The device as claimed in claim 16,
characterized in that the liquid oxygen feed device (64) comprises a valve having constant passage cross section, the duration of opening of which valve can be controlled in time.

18. The device as claimed in claim 16,
characterized in that the gas dissolved in the drink (15) is oxygen or a carbon dioxide-oxygen mixture.

19. The device as claimed in claim 18, characterized in that a first enrichment device (32) is provided for enriching the initial liquid (24) with carbon dioxide and a second enrichment device (44) is provided for enriching the initial liquid (24) with oxygen which is disposed downstream of the first enrichment device (32) in the transport direction of the initial liquid (24).

20. The device as claimed in claim 18, characterized in that an enrichment device (32') is provided for enriching the initial liquid (24) with a carbon dioxide-oxygen mixture.

21. The device as claimed in claim 16, characterized in that a cooling device (28) is provided which cools the initial liquid (24) coming from a reservoir (22) before the enrichment with gas preferably to a temperature of between about 3° C. and about 9° C., more preferably to a temperature of about 6° C.

22. The device as claimed in claim 16, characterized in that a prepressurizing device (56) is provided which prepressurizes the drinks container (10), before it is filled with the drink (15), with an inert gas, for example carbon dioxide gas.

23. The device as claimed in claim 22, characterized in that the prepressurizing pressure of the inert gas is between about 5.0 bar and about 8.0 bar, preferably between about 6.5 bar and about 7.0 bar.

24. The device as claimed in claim 16, characterized in that a mixing device (38) is provided which mixes the initial liquid (24) with at least one constituent.

25. The device as claimed in claim 19,
characterized in that the mixing device (38) is disposed between the first enrichment device (32) and the second enrichment device (44) in the transport direction of the initial liquid (24).

26. The device as claimed in claim 16, characterized in that the filling device (50) is a filling device operating according to the isobarometric filling principle.

* * * * *